United States Patent
Sood et al.

(10) Patent No.: US 11,033,853 B2
(45) Date of Patent: Jun. 15, 2021

(54) PROCESS AND APPARATUS FOR RECOVERING HYDROGEN FROM HYDROPROCESSED STRIPPER OFF GAS

(71) Applicant: UOP LLC, Des Plaines, IL (US)

(72) Inventors: Simmi Sood, Summit, NJ (US); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/997,576

(22) Filed: Jun. 4, 2018

(65) Prior Publication Data

US 2018/0280863 A1    Oct. 4, 2018

Related U.S. Application Data

(63) Continuation of application No. PCT/US2016/063110, filed on Nov. 21, 2016.
(Continued)

(51) Int. Cl.
*B01D 53/047*    (2006.01)
*C01B 3/56*    (2006.01)
(Continued)

(52) U.S. Cl.
CPC .......... *B01D 53/047* (2013.01); *C01B 3/501* (2013.01); *C01B 3/56* (2013.01); *C10G 7/00* (2013.01);
(Continued)

(58) Field of Classification Search
CPC ........... B01D 53/047; B01D 2257/108; B01D 2256/24; C10G 7/00; C10G 67/02;
(Continued)

(56) References Cited

U.S. PATENT DOCUMENTS 3,430,418 A    3/1969  Wagner
4,822,480 A *  4/1989  Harandi ................. C10G 49/22
                                                      208/212
(Continued)

FOREIGN PATENT DOCUMENTS

WO    2012/134836     *  4/2012
WO    2012082394 A2     6/2012
(Continued)

OTHER PUBLICATIONS

Peramanu, S. et al., "Economics of hydrogen recovery processes for the purification of hydroprocessor purge and off-gases", International Journal of Hydrogen Energy, 1999, vol./Issue: 24/5, pp. 405-424.
(Continued)

*Primary Examiner* — Randy Boyer
*Assistant Examiner* — Juan C Valencia
(74) *Attorney, Agent, or Firm* — Paschall & Associates, LLC; James C. Paschall

(57) ABSTRACT

A stripper off gas stream from a low pressure hydroprocessing unit may be routed to a hydrogen recovery unit to recover hydrogen. The stripper off gas stream may be scrubbed of acid gases and then compressed to hydrogen recovery pressure before it is subjected to hydrogen recovery such as in a pressure swing adsorption unit to recover high purity hydrogen.

16 Claims, 2 Drawing Sheets

Related U.S. Application Data

(60) Provisional application No. 62/269,209, filed on Dec. 18, 2015.

(51) Int. Cl.
*C10G 67/02* (2006.01)
*C01B 3/50* (2006.01)
*C10G 7/00* (2006.01)

(52) U.S. Cl.
CPC .......... *C10G 67/02* (2013.01); *B01D 2256/24* (2013.01); *B01D 2257/108* (2013.01); *C10G 2300/207* (2013.01); *C10G 2300/4081* (2013.01)

(58) Field of Classification Search
CPC ...... C10G 2300/4081; C10G 2300/207; C10G 65/12; C10G 49/22; C10G 47/00; C01B 3/501; C01B 3/56
See application file for complete search history.

(56) References Cited

U.S. PATENT DOCUMENTS

| | | |
|---|---|---|
| 6,946,016 B2 | 9/2005 | Reddy |
| 7,094,275 B2 | 8/2006 | Keefer et al. |
| 8,114,273 B2 | 2/2012 | Touffait et al. |
| 9,084,945 B2 | 7/2015 | Hoehn et al. |
| 9,127,209 B2 | 9/2015 | Van et al. |
| 9,150,797 B2 | 10/2015 | Zhu et al. |
| 2010/0107685 A1* | 5/2010 | Dragomir ............... C01B 3/506 62/617 |
| 2011/0107685 A1* | 5/2011 | Hasan ................... E04D 13/155 52/58 |
| 2014/0275667 A1* | 9/2014 | Sarker ...................... C10G 1/10 585/241 |

FOREIGN PATENT DOCUMENTS

WO     2012134836 A2    10/2012
WO   WO 2012/134836    * 10/2012

OTHER PUBLICATIONS

PCT Search Report dated Mar. 16, 2017 for corresponding PCT Application No. PCT/US2016/063110.
Indian First Examination Report dated Sep. 20, 2019 for corresponding IN Application Number 201817019173.

* cited by examiner

PROCESS AND APPARATUS FOR RECOVERING HYDROGEN FROM HYDROPROCESSED STRIPPER OFF GAS

CROSS-REFERENCE TO RELATED APPLICATIONS

This application is a Continuation of International Application No. PCT/US2016/063110 filed Nov. 21, 2016, which application claims priority from U.S. Provisional Application No. 62/269,209 filed Dec. 18, 2015, the contents of which cited applications are hereby incorporated by reference in their entirety.

FIELD

The field is the recovery of hydrogen from hydroprocessed stripper off gas streams.

BACKGROUND

Hydroprocessing can include processes which convert hydrocarbons in the presence of hydroprocessing catalyst and hydrogen to more valuable products.

Hydrotreating is a hydroprocessing process used to remove heteroatoms such as sulfur and nitrogen from hydrocarbon streams to meet fuel specifications and to saturate olefinic or aromatic compounds. Hydrotreating can be performed at high or low pressures, but is typically operated at lower pressure than hydrocracking. Hydrocracking is a hydroprocessing process in which hydrocarbons crack in the presence of hydrogen and hydrocracking catalyst to lower molecular weight hydrocarbons.

Due to environmental concerns and newly enacted rules and regulations, saleable fuels must meet lower and lower limits on contaminates, such as sulfur and nitrogen. New regulations require essentially complete removal of sulfur from diesel. For example, the ultra low sulfur diesel (ULSD) requirement is typically less than about 10 wppm sulfur.

In a refinery, hydrogen has a prime importance and recovery of hydrogen improves refinery profitability significantly. Pressure swing absorption (PSA) units are useful for purifying hydrogen by adsorbing larger molecules from the hydrogen stream at high pressure and then releasing the larger molecules at swing to lower pressure to provide a tail gas stream.

There is a continuing need, therefore, for improved methods of recovering hydrogen from hydroprocessed effluent streams.

BRIEF SUMMARY

The process and apparatus described herein enable recovery of hydrogen from a low pressure stripper off gas stream. A full recycle of stripper off gas to a hydrogen recovery unit is proposed. As much as 8-10 wt % of the make-up hydrogen gas can be recovered using a PSA unit, reducing operation expenses proportionally.

In an embodiment, a hydroprocessing process comprises hydroprocessing a hydrocarbon feed stream in a hydroprocessing reactor to provide a hydroprocessing effluent stream. The hydroprocessing effluent stream may be separated in a separator to provide a gaseous stream and a liquid stream. Light gases may be stripped from the liquid stream to provide a stripper off gas stream and a stripped hydroprocessed stream. The stripper off gas stream may be compressed and hydrogen recovered from the stripper off gas stream.

In an additional embodiment, the hydroprocessing may be conducted at a pressure of no more than 6.9 MPa (gauge) (1000 psig) to provide a hydroprocessing effluent stream and hydrogen may be recovered from the stripper off gas stream by adsorbing impurities from hydrogen in the stripper off gas stream to provide a hydrogen stream.

In a further embodiment, a hydroprocessing apparatus comprises a hydrotreating reactor and a separator in communication with the hydrotreating reactor. A stripping column may be in communication with a bottoms line of the separator. A compressor may be in communication with an overhead line from the stripping column and a hydrogen recovery unit may be in communication with an overhead of the stripping column.

DEFINITIONS

Figure 1:
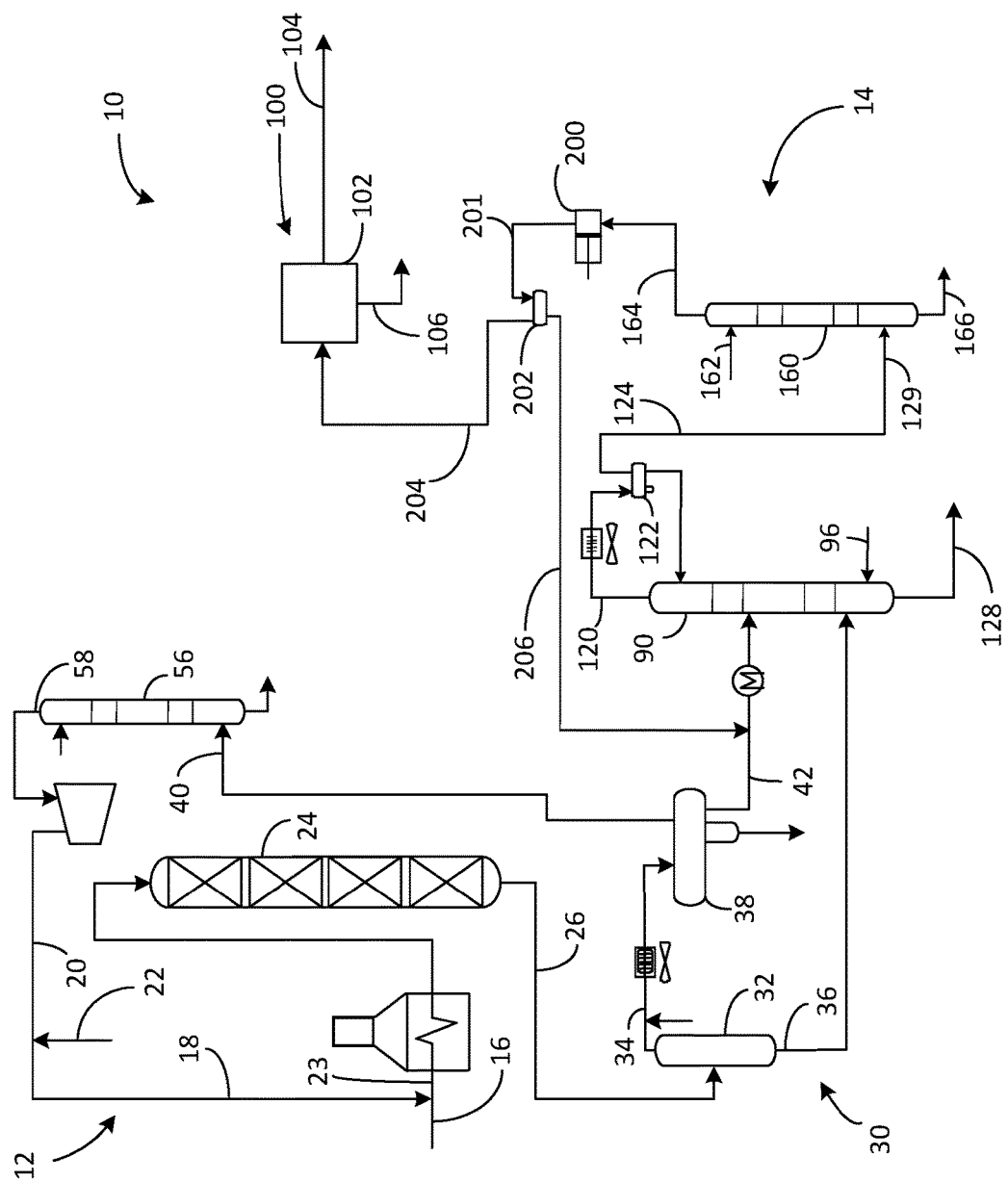
FIG. 1 is a simplified process flow diagram.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Absorber and scrubbing columns do not include a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "initial boiling point" (IBP) means the temperature at which the sample begins to boil using ASTM D-86.

As used herein, the term "T5" or "T95" means the temperature at which 5 volume percent or 95 volume percent, as the case may be, respectively, of the sample boils using ASTM D-86.

As used herein, the term "diesel cut point" is between about 343° C. (650° F.) and about 399° C. (750° F.) using the TBP distillation method.

As used herein, the term "diesel boiling range" means hydrocarbons boiling with an IBP in the range of between about 132° C. (270° F.) and about 210° C. (410° F.) and the diesel cut point using the TBP distillation method.

As used herein, the term "diesel conversion" means conversion of feed to material that boils at or below the diesel cut point of the diesel boiling range.

As used herein, the term "kerosene boiling range" means hydrocarbons boiling with an IBP in the range of between about 120° C. (248° F.) and about 150° C. (302° F.) and a kerosene cut point in the range of between about 132° C. (270° F.) and about 260° C. (500° F.) using the TBP distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

As used herein, the term "predominant" or "predominate" means greater than 50%, suitably greater than 75% and preferably greater than 90%.

DETAILED DESCRIPTION

Hydrogen is expensive to produce and in most refineries and is constrained due to limited capacity in hydrogen production plants. In hydroprocessing units, hydrogen loss may be attributed to solution losses in hot separator and cold separator liquid streams. Hot separator and cold separator liquid streams go into a stripper column and subsequently into the overhead off gas stream.

Low pressure hydroprocessing processes such as hydrotreating and mild hydrocracking generate off gases from a stripper overhead that contains high hydrogen content. Off gas streams are typically blended into the refinery fuel gas and burned. Typically, hydrogen recovery from stripper off gases was viewed as infeasible if the hydroprocessing process is conducted at low pressures. Hence, hydrogen can be recovered from these streams to reduce overall hydrogen consumption.

The apparatus and process 10 for hydroprocessing hydrocarbons comprise a hydroprocessing unit 12, a separator section 30, a hydrogen recovery unit 100 and a product recovery unit 14. A hydrocarbonaceous stream in hydrocarbon line 16 and a hydrogen stream in hydrogen line 18 are fed to the hydroprocessing unit 12. Hydroprocessing effluent is separated in the product recovery unit 14.

A recycle hydrogen stream in recycle hydrogen line 20 may be supplemented by a make-up hydrogen stream from line 22 to provide the hydrogen stream in hydrogen line 18. The hydrogen stream may join the hydrocarbonaceous stream in feed line 16 to provide a hydrocarbon feed stream in feed line 23. The hydrocarbon feed stream in line 23 may be heated in a fired heater and fed to the hydroprocessing reactor 24. The hydrocarbon feed stream is hydroprocessed in the hydroprocessing reactor 24.

In one aspect, the process and apparatus described herein are particularly useful for hydroprocessing a hydrocarbon feed stream comprising a hydrocarbonaceous feedstock. Illustrative hydrocarbonaceous feedstocks include hydrocarbonaceous streams having initial boiling points (IBP) above about 288° C. (550° F.), such as atmospheric gas oils, vacuum gas oil (VGO) having T5 and T95 between about 315° C. (600° F.) and about 600° C. (1100° F.), deasphalted oil, coker distillates, straight run distillates, pyrolysis-derived oils, high boiling synthetic oils, cycle oils, hydrocracked feeds, catalytic cracker distillates, atmospheric residue having an IBP at or above about 343° C. (650° F.) and vacuum residue having an IBP above about 510° C. (950° F.). Preferred feedstocks include hydrocarbon feeds boiling in the diesel boiling range and in the kerosene boiling range.

Hydroprocessing that occurs in the hydroprocessing unit 12 may be hydrocracking or hydrotreating. Hydrocracking refers to a process in which hydrocarbons crack in the presence of hydrogen to lower molecular weight hydrocarbons.

Hydroprocessing that occurs in the hydroprocessing unit may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point or pour point of the hydrotreated product may also be reduced by hydroisomerization. A hydrocracking reactor may be preceded by a hydrotreating reactor and a separator (not shown) to remove sulfur and nitrogen contaminants from the feed to the hydrocracking reactor. Hydrotreating is the preferred process in the hydroprocessing unit 12. Consequently, the term "hydroprocessing" will include the term "hydrotreating" herein.

The hydroprocessing reactor 24 may be a fixed bed reactor that comprises one or more vessels, single or multiple beds of catalyst in each vessel, and various combinations of hydrotreating catalyst and/or hydrocracking catalyst in one or more vessels. It is contemplated that the hydroprocessing reactor 24 be operated in a continuous liquid phase in which the volume of the liquid hydrocarbon feed is greater than the volume of the hydrogen gas. The hydroprocessing reactor 24 may also be operated in a conventional continuous gas phase, a moving bed or a fluidized bed hydroprocessing reactor.

If the hydroprocessing reactor 24 is operated as a hydrocracking reactor, it may provide total conversion of at least about 20 vol % and typically greater than about 60 vol % of the hydrocarbon feed to products boiling below the diesel cut point. A hydrocracking reactor may operate at partial conversion of more than about 30 vol % or full conversion of at least about 90 vol % of the feed based on total conversion. A hydrocracking reactor may be operated at mild hydrocracking conditions which will provide about 20 to about 60 vol %, preferably about 20 to about 50 vol %, total conversion of the hydrocarbon feed to product boiling below the diesel cut point. If the hydroprocessing reactor 24 is operated as a hydrotreating reactor, it may provide conversion per pass of about 10 to about 30 vol %.

If the hydroprocessing reactor 24 is a hydrocracking reactor, the first vessel or bed in the hydrocracking reactor 24 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 24. If the hydrocracking reactor is a mild hydrocracking reactor, it may contain several beds of hydrotreating catalyst followed by a fewer beds of hydrocracking catalyst. If the hydroprocessing reactor 24 is a hydrotreating reactor it may comprise more than one vessel and multiple beds of hydrotreating catalyst. The hydrotreating reactor may also contain hydrotreating catalyst that is suited for saturating aromatics, hydrodewaxing and hydroisomerization.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 24. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably from about 4.1 MPa (gauge) (600 psig) to about 11.0 MPa (gauge) (1600 psig), and preferably no more than 6.9 MPa (gauge) (1000 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,011 $Nm^3/m^3$ oil (6,000 scf/bbl), preferably about 168 $Nm^3/m^3$ oil (1,000 scf/bbl) to about 674 $Nm^3/m^3$ oil (4,000 scf/bbl), with a hydrotreating catalyst or a combination of hydrotreating catalysts.

Suitable hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 24 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{10}$ meters), wherein the silica/alumina mole ratio is about 4 to 6. One example of a zeolite in the preferred group is synthetic Y molecular sieve.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt % noble metal.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions. Alternatively, the base component may first be pelleted, followed by the addition of the hydrogenating component and activation by calcining.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 11.0 MPa (gauge) (1600 psig), preferably no more than 6.9 MPa (gauge) (1000 psig), a liquid hourly space velocity (LHSV) from about 0.4 to less than about 2.5 $hr^{-1}$ and a hydrogen rate of about 421 (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 8.3 MPa (gauge) (1200 psig) and preferably no more than about 6.9 MPa (gauge) (1000 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

The hydroprocessing reactor 24 provides a hydroprocessing effluent stream that exits the hydroprocessing reactor 24 in a hydroprocessing effluent line 26. The hydroprocessing effluent stream comprises material that will be separated in a separation section 30 comprising one or more separators into a liquid hydroprocessed stream and a gaseous hydroprocessed stream. The separation section 30 is in downstream communication with the hydroprocessing reactor 24.

The hydroprocessing effluent stream in hydroprocessing effluent line 26 may in an aspect be heat exchanged with the hydrocarbon feed stream in line 16 to be cooled before entering a hot separator 32. The hot separator separates the hydroprocessing effluent to provide a hydrocarbonaceous hot gaseous stream in an overhead line 34 and a hydrocarbonaceous hot liquid stream in a bottoms line 36. The hot separator 32 may be in downstream communication with the hydroprocessing reactor 24. The hot separator 32 operates at about 177° C. (350° F.) to about 371° C. (700° F.) and preferably operates at about 232° C. (450° F.) to about 315° C. (600° F.). The hot separator 32 may be operated at a slightly lower pressure than the hydroprocessing reactor 24 accounting for pressure drop of intervening equipment. The hot separator may be operated at pressures around that of the hydroprocessing reactor 24 less frictional losses. The liquid hydrocarbonaceous hot liquid stream 36 may have a temperature of the operating temperature of the hot separator 32.

The hot gaseous stream in the overhead line 34 may be cooled before entering a cold separator 38. As a consequence of the reactions taking place in the hydroprocessing reactor 24 wherein nitrogen, chlorine and sulfur are removed from the feed, ammonia and hydrogen sulfide are formed. At a characteristic temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 34 transporting the hot gaseous stream, a suitable amount of wash water may be introduced into line 34 upstream of a cooler at a point in line 34 where the temperature is above the characteristic sublimation temperature of either compound.

The hot gaseous stream may be separated in the cold separator 38 to provide a cold gaseous stream comprising a hydrogen-rich gas stream in an overhead line 40 and a cold liquid stream in a cold bottoms line 42. The cold separator 38 serves to separate hydrogen from hydrocarbon in the hydroprocessing effluent for recycle to the hydroprocessing reactor 24 in the cold overhead line 40. The cold separator 38, therefore, is in downstream communication with the overhead line 34 of the hot separator 32 and the hydroprocessing reactor 24. The cold separator 38 may be operated at about 100° F. (38° C.) to about 150° F. (66° C.), suitably about 115° F. (46° C.) to about 145° F. (63° C.), and just below the pressure of the hydroprocessing reactor 24 and the hot separator 30 accounting for pressure drop of intervening equipment to keep hydrogen and light gases in the overhead and normally liquid hydrocarbons in the bottoms. The cold separator 38 may also have a boot for collecting an aqueous phase. The cold liquid stream may have a temperature of the operating temperature of the cold separator 38.

The hydrocarbonaceous hot liquid stream in the hot bottoms line 36 may be stripped as hot hydroprocessing effluent stream in a stripper column 90. In an aspect, the hot liquid stream in the hot bottoms line 36 may be let down in pressure and flashed in a hot flash drum (not shown) to reduce the pressure of the hot liquid stream in line 36.

In an aspect, the cold liquid stream in the cold bottoms line 42 may be stripped as a cold hydroprocessing effluent stream in the stripper column 90. In a further aspect, the cold liquid stream may be let down in pressure and flashed in a cold flash drum (not shown) to reduce the pressure of the cold liquid stream in the bottoms line 42. A cold aqueous stream may be removed from a boot in the cold separator 38.

The cold gaseous stream in the overhead line 40 is rich in hydrogen. Thus, hydrogen can be recovered from the cold gaseous stream. The cold gaseous stream in overhead line 40 may be passed through a trayed or packed recycle scrubbing column 56 where it is scrubbed by means of a scrubbing extraction liquid such as an aqueous amine solution to remove acid gases including hydrogen sulfide and carbon dioxide by extracting them into the aqueous solution. In the recycle scrubber column 56, the cold gaseous stream enters the recycle scrubber column 56 at an inlet near a bottom and flows upwardly, while a lean amine stream in a solvent line enters the stripper scrubber column at an inlet near a top and flows downwardly. Preferred lean amines include alkanolamines DEA, MEA, and MDEA. Other amines can be used in place of or in addition to the preferred amines. The spent scrubbing liquid from the bottoms may be regenerated and recycled back to the recycle scrubbing column 56. The scrubbed hydrogen-rich stream emerges from the scrubber via an overhead line 58 and may be compressed in a recycle compressor to provide a recycle hydrogen stream in line 20. The recycle hydrogen stream in line 20 may be supplemented with make-up hydrogen stream 22 to provide the hydrogen stream in hydrogen line 18. A portion of the material in line 20 may be routed to the intermediate catalyst bed outlets in the hydroprocessing reactor 24 to control the inlet temperature of the subsequent catalyst bed (not shown).

The product recovery section 14 may include a stripping column 90 and a stripping scrubber column 160. The stripping column 90 may be in downstream communication with a bottoms line in the separation section 30. For example, the stripping column 90 may be in downstream communication with the hydroprocessing reactor 24, the hot bottoms line 36 and/or the cold bottoms line 42. In an aspect, the stripping column 90 may comprise two stripping columns. The stripping column 90 may be in downstream communication with the cold bottoms line 42 for stripping the cold hydroprocessing liquid stream. The stripping column 90 may be in downstream communication with the hot bottoms line 36 for stripping a hot hydroprocessing liquid stream which is hotter than the cold hydroprocessing liquid stream. The hot hydroprocessing liquid stream is hotter than the cold hydroprocessing liquid stream, by at least 25° C. and preferably at least 50° C.

The cold hydroprocessing liquid stream may be heated and fed to the stripping column 90 at a location that may be in the top half of the stripping column 90. The hot hydroprocessing effluent stream may be heated and fed to the stripping column 90 at a location that may be in the bottom half of the stripping column 90. The cold hydroprocessing effluent stream and the hot hydroprocessing effluent stream which each comprise at least a portion of the hydroprocessing effluent stream may be stripped of light gases in the stripping column 90 with a stripping media which is an inert gas such as steam from a stripping media line 96 to provide an overhead vapor stream of naphtha, hydrogen, hydrogen sulfide, steam and other gases in a stripper overhead line 120. Alternatively, the stripping column may use a reboiler which may be a fired heater and omit the stripping media line 96 but this embodiment is not shown. The stripping column 90 strips light gases from the hot liquid stream and/or the cold liquid stream to provide a stripper off gas stream and a stripped hydroprocessed stream.

At least a portion of the stripper overhead off gas stream may be condensed and separated in a receiver 122. A stripper net overhead line 124 from the receiver 122 carries a net stripper off gas stream for further treating. The stripper may be run at total reflux, so all condensed material may be refluxed to the column. Alternatively, unstabilized liquid naphtha from the bottoms of the receiver 122 may be split between a reflux portion refluxed to the top of the stripping column 90 and a stripper overhead liquid stream which may be recovered, but the stripper overhead liquid stream is not shown. A sour water stream (not shown) may be collected from a boot of the overhead receiver 122.

The stripping column 90 may be operated with a bottoms temperature between about 160° C. (320° F.) and about 360° C. (680° F.), and an overhead pressure of about 0.35 MPa (gauge) (50 psig), preferably about 0.70 MPa (gauge) (100 psig), to about 2.0 MPa (gauge) (300 psig). The temperature in the overhead receiver 122 ranges from about 38° C. (100° F.) to about 66° C. (150° F.) and the pressure is essentially the same as in the overhead of the stripping column 90.

When the feed stream to the hydroprocessing reactor 24 is a diesel stream, a stripped hydroprocessed stream in a bottoms line 128 comprises predominantly diesel range boiling material. Consequently, the stripped hydroprocessed stream in stripped bottoms line 128 may be transported to a diesel blending pool and stored. When the feed stream to the hydroprocessing reactor 24 is a kerosene stream, a stripped hydroprocessed stream in a bottoms line 128 comprises predominantly kerosene range boiling material. Consequently, the stripped hydroprocessed stream in stripped bottoms line 128 may be transported to a kerosene blending pool and stored. If the feed stream to the hydroprocessing reactor 24 is a heavier stream such as a gas oil, the stripped hydroprocessed stream in stripped bottoms line 128 may be fed to a fractionation column that is not shown for recover naphtha, kerosene, diesel and unconverted oil streams.

The net stripper off gas stream in the net stripper overhead line 124 rich in hydrogen gas may be routed to a stripper scrubber column 160. In the stripper scrubber column 160, the stripper off gas stream enters the stripper scrubber column at an inlet near a bottom and flows upwardly, while a lean amine stream in solvent line 162 enters the stripper scrubber column at an inlet near a top and flows downwardly. Preferred lean amines include alkanolamines DEA, MEA, and MDEA. Other amines can be used in place of or in addition to the preferred amines. The lean amine contacts the net stripper off gas stream and absorbs acid gas contaminants such as hydrogen sulfide and carbon dioxide from the stripper off gas stream. The resultant "sweetened" stripper off gas stream is taken out from an overhead outlet of the stripper scrubber column in a stripper scrubber overhead line 164, and a rich amine is taken out from the bottoms at a bottom outlet of the stripper scrubber column in scrubber bottoms line 166. The rich amine may undergo regeneration to remove the hydrogen sulfide for processing to generate elemental sulfur and recycle to the stripper scrubber column 160.

We have found that the sweetened stripper off gas stream may comprise 5 to 15 wt % of the make-up hydrogen flow rate. However, it may be at a pressure that is too low for hydrogen recovery. Accordingly, it is proposed to compress the sweetened stripper off gas stream in a compressor 200 to a pressure that facilitates hydrogen recovery in a hydrogen recovery unit 100. In an aspect, the sweetened stripper off gas stream may be compressed in a stripper off gas compressor 200 up to about 2200 kPa (gauge) (320 psig) to about 3100 kPa (gauge) (450 psig). The compressed, sweetened stripper off gas stream may be fed from the stripper off gas compressor 200 in compressor line 201 to a knock out drum 202 to remove a compressed, condensed stream in a bottoms line 206 for transport to the stripper column 90. The knock out drum 202 may be in downstream communication with the compressor 200. The bottoms line 206 may transport the compressed, condensed stream to the cold bottoms line 42 which transports the compressed, condensed stream and the cold liquid stream in cold bottoms line 42 together to the stripper column 90. The remaining compressed sweetened stripper off gas may be transported from the knock out drum 202 to the hydrogen recovery unit 100 in a hydrogen recovery feed line 204 which may be an overhead line from the knock out drum 202. The stripper off gas compressor may be in downstream communication with the stripper column 90, the stripper overhead line 120 and the net stripper overhead line 124.

The hydrogen recovery unit 100 recovers hydrogen from the compressed, sweetened stripper off gas stream. The hydrogen recovery unit 100 may be in downstream communication with an overhead line of the stripping column 90 and the absorption column 160. The hydrogen recovery unit 100 may comprise a membrane for recovering a hydrogen stream. In an aspect, the hydrogen recovery unit comprises a pressure swing adsorption (PSA) unit 102 comprising a plurality of adsorbent beds.

The PSA unit 102 may be in downstream communication with an overhead line of the stripping column 90 and the absorption column 160. In the PSA unit 102, impure gases are adsorbed from hydrogen in the compressed, sweetened stripper off gas stream. In an embodiment, the hydrogen in the gaseous stream can be purified in a pressure swing adsorption (PSA) unit 102 shown in FIG. 2 to recover a hydrogen rich gaseous stream having a reduced concentration of hydrogen sulfide, ammonia, amines and hydrocarbons. The pressure swing adsorption process separates hydrogen from larger molecules in the hydrogen recovery feed line 204. The larger impurities are adsorbed on an adsorbent at a high adsorption pressure while allowing passage of the smaller hydrogen molecules. Pressure reduction is effected to a lower desorption pressure to desorb the adsorbed larger species. It is generally desirable to employ the PSA process in multiple bed systems such as those described in U.S. Pat. No. 3,430,418, in which at least four adsorption beds are employed. The PSA process is carried out in such systems on a cyclical basis, employing a processing sequence.

Figure 2:
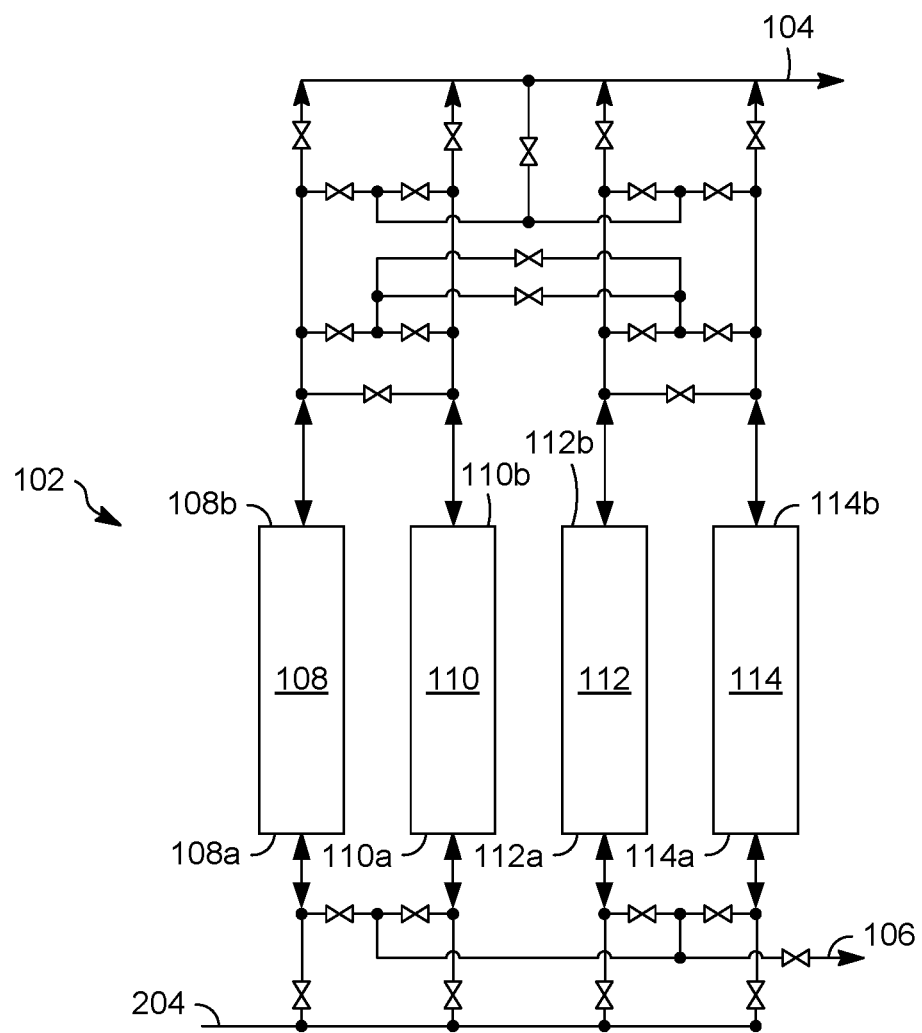
FIG. 2 is a further detail of a PSA unit of FIG. 1.

Referring to FIG. 2, the PSA unit 102 may have four beds 108-114 having inlet ends 108a-114a and outlet ends 108b-114b, respectively. In the first step, the scrubbed stream in the hydrogen recovery feed line 204 is fed to an inlet end 108a of a first adsorbent bed 108 at high adsorption pressure such as about 1 MPa (150 psia) to about 1.7 MPa (250 psia) to adsorb adsorbable species onto the adsorbent with passage of product hydrogen gas to a discharge end 108b of the bed 108 for 5 to 10 minutes. A purified hydrogen stream may pass from the PSA unit 102 through product line 104 with a greater hydrogen purity than in the hydrogen recovery feed line 204. Feed flow is terminated to the first bed 108 before the larger molecules break through to the discharge end 108b of the first bed. Second, the first bed 108 is cocurrently depressurized to an intermediate pressure such as about 0.7 MPa (100 psia) to about 1 MPa (150 psia) for 0.5 to 2 minutes by releasing void space gas from the discharge end 108b of the first bed to a discharge end 110b of a second bed 110 thereby repressurizing the second bed which has just been purged of desorbed larger molecules. Further cocurrent depressurization of the first bed 108 to a pressure of about 0.7 MPa (50 psia) to about 0.5 MPa (75 psia) can occur by releasing remaining void space gas to a discharge end 112b of a third bed 112 to purge the third bed of desorbed larger molecules for 5 to 10 minutes. In a third step, the inlet 108a to the first bed 108 is opened in a countercurrent depressurization or blow down step, in which gas departs the first bed through the inlet end 108a leaving the first bed 108 at sufficiently low pressure such as about 34.5 kPa (5 psia) to about 172 kPa (25 psia) to desorb adsorbed species from the adsorbent for about 0.5 to 2 minutes. Desorbed species are released through the inlet 108a and recovered in a tail gas line 106 with a greater concentration of adsorbable species than in hydrogen recovery feed line 204. In a fourth step, void space gas from a fourth bed 114 may be released through a discharge end 114b thereof and fed through the discharge end 108b of the first bed 108 to purge out the desorbed species. In a last step, void space gas from the second bed 110 is fed from its discharge end 110b into the discharge end 108b of the first bed 108 to repressurize the first bed. Product gas from the discharge end 112b of the third bed 112 is then fed into the discharge end 108b of the first bed 108 to achieve adsorption pressure in the first bed 108 of about 1 MPa (150 psia) to about 1.7 MPa (250 psia) for 5 to 10 minutes. Since the first bed 108 is now at adsorption pressure, the cycle in the first bed begins anew. The same process sequence is operated with the other beds 110-114, with differences relating to the position of the bed 110-114 in the order.

A suitable adsorbent may be activated calcium zeolite A with or without activated carbon. Purified hydrogen with a hydrogen concentration greater and a hydrocarbon concentration less than in the compressed, sweetened stripper off gas stream in the hydrogen recovery feed line 204 can be transported in line 104 for recycle or transport to the hydrogen header for use anywhere in a refinery. The tail gas line 106 contains hydrocarbons with a reduced concentration of hydrogen and an increased concentration of hydrocarbons relative to the concentration in the hydrogen recovery feed line 204. Because the tail gas stream in tail gas line 106 comprises substantial hydrocarbons, it may be compressed in a tail gas compressor 142 and transported to a hydrocarbon recovery section.

By use of the stripper off gas compressor and the hydrogen recovery unit about 7 to about 12 wt % of the make up hydrogen gas can be recovered and recycled, thereby reducing hydrogen gas consumption accordingly.

Examples

We calculated the improvement in hydrogen recovery by compressing sweetened stripper off gas from a distillate hydrotreating unit operating at 4.1 MPa (gauge) (600 psig). The sweetened stripper off gas stream was compressed to 2670 kPa (gauge) (390 psig) and processed in a PSA unit. Hydrogen recovery improved by 87 wt % compared with not recovering hydrogen from this stream.

Specific Embodiments

While the following is described in conjunction with specific embodiments, it will be understood that this description is intended to illustrate and not limit the scope of the preceding description and the appended claims.

A first embodiment of the invention is a process comprising hydroprocessing a hydrocarbon feed stream in a hydroprocessing reactor to provide a hydroprocessing effluent stream; separating the hydroprocessing effluent stream in a separator to provide a gaseous stream and a liquid stream; stripping light gases from the liquid stream to provide a stripper off gas stream and a stripped hydroprocessed stream; compressing the stripper off gas stream; and recovering hydrogen from the stripper off gas stream. An embodiment of the invention is one, any or all of prior embodiments in this paragraph up through the first embodiment in this paragraph wherein recovering hydrogen from the stripper off gas stream comprises adsorbing impurities from hydrogen in the stripper off gas stream to provide a hydrogen stream. An embodiment of the invention is one, any or all of prior embodiments in this paragraph up through the first embodiment in this paragraph further comprising absorbing acid gases from the stripper off gas stream prior to compression. An embodiment of the invention is one, any or all of prior embodiments in this paragraph up through the first embodiment in this paragraph further comprising separating the separator gaseous stream in a cold separator to provide a cold gaseous stream and a cold liquid stream and stripping the cold liquid stream to provide the stripper off gas stream. An embodiment of the invention is one, any or all of prior embodiments in this paragraph up through the first embodiment in this paragraph further comprising stripping the cold liquid stream and the hot liquid stream together. An embodiment of the invention is one, any or all of prior embodiments in this paragraph up through the first embodiment in this paragraph further comprising storing the stripped hydroprocessed stream as product. An embodiment of the invention is one, any or all of prior embodiments in this paragraph up through the first embodiment in this paragraph further comprising stripping the light gases from the separator liquid stream at less than 2.0 MPa (g) (300 psig). An embodiment of the invention is one, any or all of prior embodiments in this paragraph up through the first embodiment in this paragraph further comprising cooling a stripper overhead off gas stream and separating the stripper overhead off gas stream into the stripper off gas stream and a stripper overhead liquid stream. An embodiment of the invention is one, any or all of prior embodiments in this paragraph up through the first embodiment in this paragraph further comprising hydroprocessing the hydrocarbon feed stream at a pressure of no more than 6.9 MPa (gauge) (1000 psig). An embodiment of the invention is one, any or all of prior embodiments in this paragraph up through the first embodiment in this paragraph further comprising pressuring the stripper off gas stream to a pressure of about 2200 kPa (gauge) (320 psig) to about 3100 kPa (gauge) (450 psig).

A second embodiment of the invention is a process comprising hydroprocessing a hydrocarbon feed stream in a hydroprocessing reactor at a pressure of no more than 6.9 MPa (gauge) (1000 psig) to provide a hydroprocessing effluent stream; separating the hydroprocessing effluent stream in a separator to provide a gaseous stream and a liquid stream; stripping light gases from the liquid stream to provide a stripper off gas stream and a stripped hydroprocessed stream; compressing the stripper off gas stream; and recovering hydrogen from the stripper off gas stream by adsorbing impurities from hydrogen in the stripper off gas stream to provide a hydrogen stream. An embodiment of the invention is one, any or all of prior embodiments in this paragraph up through the second embodiment in this paragraph further comprising separating the separator gaseous stream in a cold separator to provide a cold gaseous stream and a cold liquid stream and stripping the cold liquid stream to provide the stripper off gas stream. An embodiment of the invention is one, any or all of prior embodiments in this paragraph up through the second embodiment in this paragraph further comprising stripping the cold liquid stream and the hot liquid stream together. An embodiment of the invention is one, any or all of prior embodiments in this paragraph up through the second embodiment in this paragraph further comprising absorbing acid gases from the stripper off gas stream prior to compression. An embodiment of the invention is one, any or all of prior embodiments in this paragraph up through the second embodiment in this paragraph further comprising storing the stripped hydroprocessed stream as product. An embodiment of the invention is one, any or all of prior embodiments in this paragraph up through the second embodiment in this paragraph further comprising stripping the light gases from the separator liquid stream at less than 2.0 MPa (g) (300 psig).

A third embodiment of the invention is an apparatus comprising a hydrotreating reactor; a separator in communication with the hydrotreating reactor; a stripping column in communication with a bottoms line of the separator; a compressor in communication with an overhead line from the stripping column; and a hydrogen recovery unit in communication with an overhead of the stripping column. An embodiment of the invention is one, any or all of prior embodiments in this paragraph up through the third embodiment in this paragraph further comprising an absorption column in downstream communication with the overhead line of the stripping column and the hydrogen recovery unit is in downstream communication with the absorption column. An embodiment of the invention is one, any or all of prior embodiments in this paragraph up through the third embodiment in this paragraph wherein the hydrogen recovery unit is a pressure swing adsorption unit. An embodiment of the invention is one, any or all of prior embodiments in this paragraph up through the third embodiment in this paragraph further comprising a cold separator in downstream communication with an overhead line of the separator and the stripping column is in downstream communication with a bottoms line of the cold separator.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydroprocessing process comprising:
hydroprocessing a hydrocarbon feed stream in a hydroprocessing reactor to provide a hydroprocessing effluent stream;
separating said hydroprocessing effluent stream in a separator to provide a separator gaseous stream and a separator liquid stream;
separating said separator gaseous stream in a cold separator to provide a cold gaseous stream and a cold liquid stream and stripping said cold liquid stream to provide a stripper off gas stream;
stripping light gases from said separator liquid stream to provide said stripper off gas stream and a stripped hydroprocessed stream;
compressing said stripper off gas stream to a pressure of about 2200 kPa (gauge) (320 psig) to about 3100 kPa (gauge) (450 psig) to provide a compressed stripper off gas stream; and
recovering hydrogen from said compressed stripper off gas stream.

2. The process of claim 1 wherein recovering hydrogen from said stripper off gas stream comprises adsorbing impurities from hydrogen in said stripper off gas stream to provide a hydrogen stream.

3. The process of claim 1 further comprising absorbing acid gases from said stripper off gas stream prior to compression.

4. The process of claim 1 further comprising stripping said cold liquid stream and a hot liquid stream together.

5. The process of claim 1 further comprising storing said stripped hydroprocessed stream as product.

6. The process of claim 1 further comprising stripping said light gases from said separator liquid stream at less than 2.0 MPa (g) (300 psig).

7. The process of claim 1 further comprising cooling a stripper overhead off gas stream and separating said stripper overhead off gas stream into said stripper off gas stream and a stripper overhead liquid stream.

8. The process of claim 1 further comprising hydroprocessing said hydrocarbon feed stream at a pressure of no more than 6.9 MPa (gauge) (1000 psig).

9. A hydroprocessing process comprising:
hydroprocessing a hydrocarbon feed stream in a hydroprocessing reactor at a pressure of no more than 6.9 MPa (gauge) (1000 psig) to provide a hydroprocessing effluent stream;
separating said hydroprocessing effluent stream in a separator to provide a separator gaseous stream and a separator liquid stream;
separating said separator gaseous stream in a cold separator to provide a cold gaseous stream and a cold liquid stream and stripping said cold liquid stream to provide a stripper off gas stream;
stripping light gases from said separator liquid stream to provide said stripper off gas stream and a stripped hydroprocessed stream;
compressing said stripper off gas stream to a pressure of about 2200 kPa (gauge) (320 psig) to about 3100 kPa (gauge) (450 psig) to provide a compressed stripper off gas stream; and
recovering hydrogen from said compressed stripper off gas stream by adsorbing impurities from hydrogen in said stripper off gas stream to provide a hydrogen stream.

10. The process of claim 9 further comprising stripping said cold liquid stream and a hot liquid stream together.

11. The process of claim 9 further comprising absorbing acid gases from said stripper off gas stream prior to compression.

12. The process of claim 9 further comprising storing said stripped hydroprocessed stream as product.

13. The process of claim 9 further comprising stripping said light gases from said separator liquid stream at less than 2.0 MPa (g) (300 psig).

14. A hydroprocessing apparatus comprising:
a hydrotreating reactor;
a separator in communication with said hydrotreating reactor;
a stripping column in communication with a bottoms line of said separator;

a compressor in communication with an overhead line from said stripping column;

a hydrogen recovery unit in communication with an overhead of said stripping column; and a cold separator in downstream communication with an overhead line of said separator and said stripping column is in downstream communication with a bottoms line of said cold separator.

15. The apparatus of claim 14 further comprising an absorption column in downstream communication with said overhead line of said stripping column and said hydrogen recovery unit is in downstream communication with said absorption column.

16. The apparatus of claim 14 wherein said hydrogen recovery unit is a pressure swing adsorption unit.

* * * * *